United States Patent [19]

Nishikawa

[11] Patent Number: 5,586,097
[45] Date of Patent: Dec. 17, 1996

[54] OPTICAL HEAD FOR GENERATING A PLURALITY OF LIGHT BEAMS AND AN OPTO-MAGNETIC RECORDING/REPRODUCING/ERASING APPARATUS USING SAME

[75] Inventor: Koichiro Nishikawa, Takasaki, Japan

[73] Assignee: Canon Kabushiki Kaisha, Tokyo, Japan

[21] Appl. No.: 337,406

[22] Filed: Nov. 8, 1994

[30] Foreign Application Priority Data

Nov. 24, 1993  [JP]  Japan .................................. 5-292918

[51] Int. Cl.⁶ ........................................................ G11B 7/00
[52] U.S. Cl. ........................... 369/112; 369/110; 369/121; 369/44.37; 360/114
[58] Field of Search .................................... 369/112, 110, 369/122, 121, 120, 13, 44.37, 44.38, 44.11; 360/114

[56] References Cited

U.S. PATENT DOCUMENTS

| | | | |
|---|---|---|---|
| 4,517,667 | 5/1985 | Sprague | 369/122 |
| 5,043,960 | 8/1991 | Nakao et al. | 369/13 |
| 5,105,407 | 4/1992 | Ishika | 369/44.37 |
| 5,144,616 | 9/1992 | Yasukawa et al. | 369/121 |
| 5,353,274 | 10/1994 | Nishikawa | 369/121 |
| 5,359,588 | 10/1994 | Fujita et al. | 369/110 |
| 5,406,542 | 4/1995 | Morimoto | 369/112 |

*Primary Examiner*—Loha Ben
*Attorney, Agent, or Firm*—Fitzpatrick, Cella, Harper & Scinto

[57] ABSTRACT

A recording/reproducing/erasing optical head for generating a plurality of light beams detects a defocused state by a method in which a light beam is caused to be nearly parallel to form optical spots on an opto-magnetic disk, the light beam from the optical spots on the opto-magnetic disk is condensed on a sensor by an objective lens and a condenser lens, and the size of the light spot on the sensor spaced by a predetermined distance in front of or behind the focal point of the condenser lens, and the size of the light spot on the sensor indicate the defocus state, wherein if the focal length of the objective lens is denoted as $f_o$, the numerical aperture of the objective lens as NA, the focal length of the condenser lens as $f_{con}$, the predetermined distance is $\Delta d$[mm], and $(f_{con}/f_o)^2 = \gamma$, the following relation is satisfied:

$$0.005\gamma \Delta d \pm (0.010/NA - 0.003)\gamma.$$

14 Claims, 5 Drawing Sheets

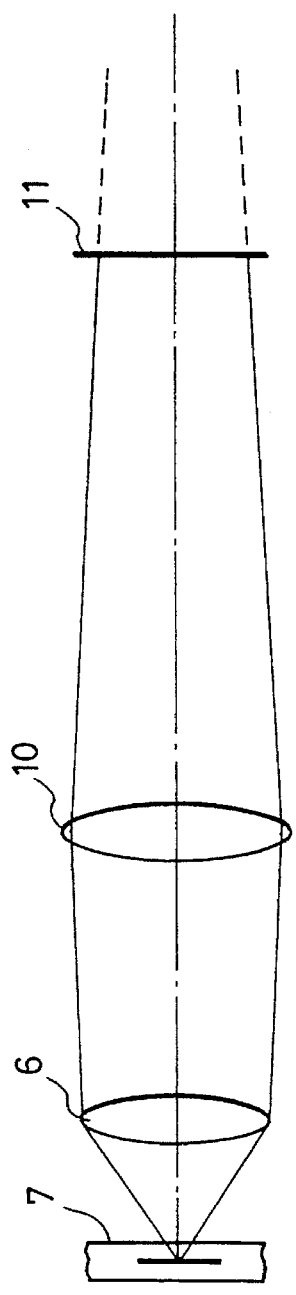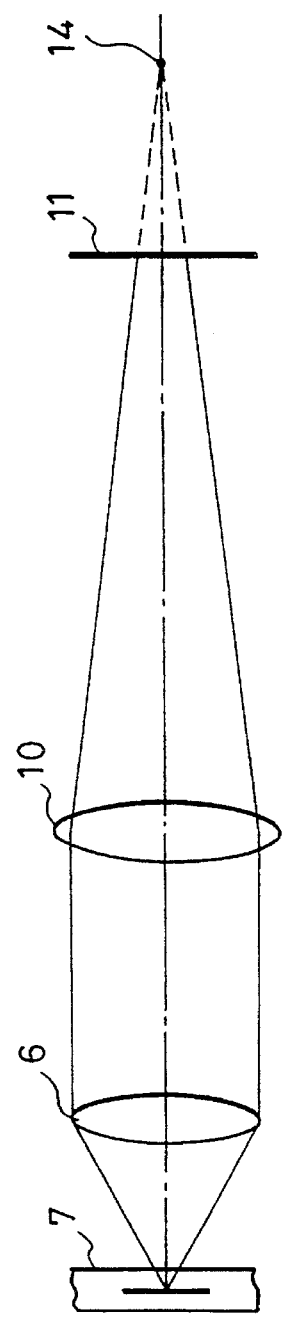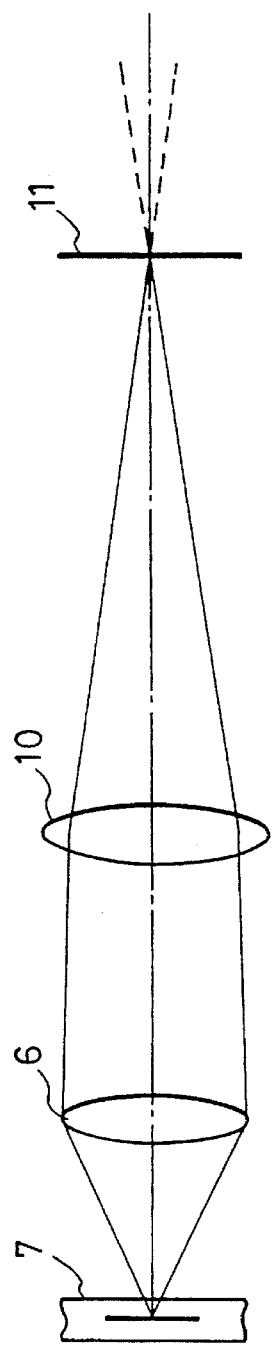
FIG. 2(a) PRIOR ART
FIG. 2(b) PRIOR ART
FIG. 2(c) PRIOR ART

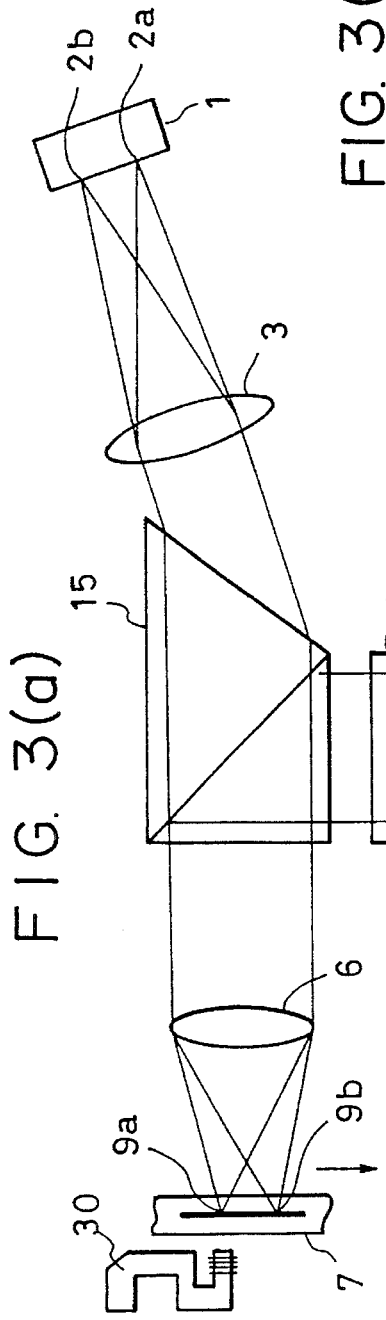
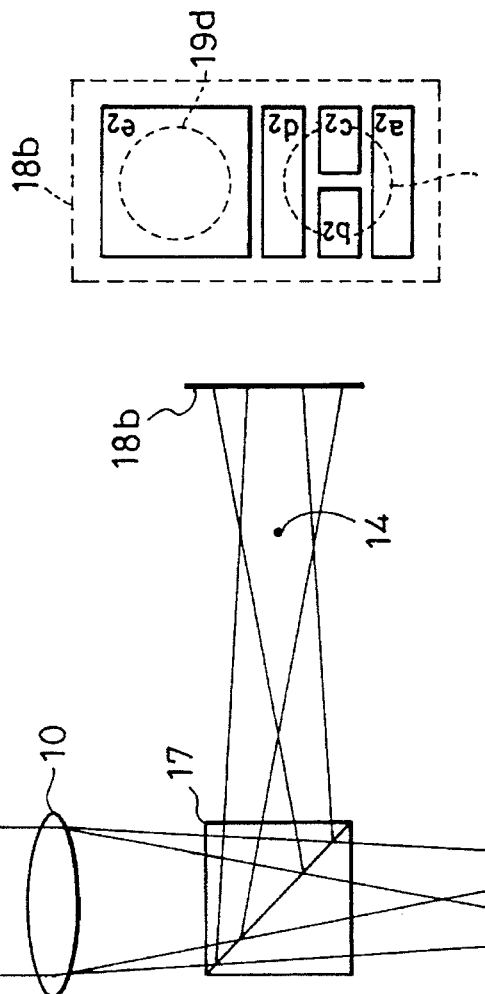
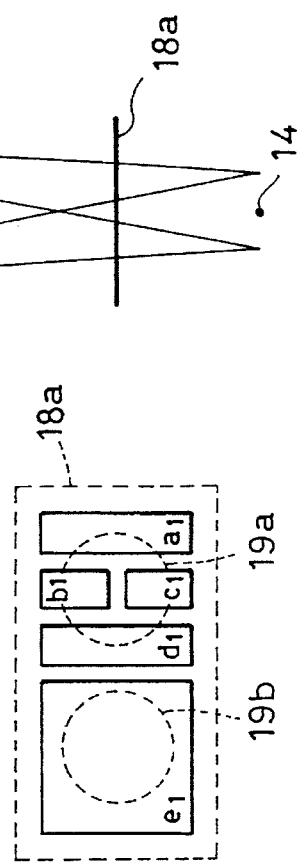

OPTICAL HEAD FOR GENERATING A PLURALITY OF LIGHT BEAMS AND AN OPTO-MAGNETIC RECORDING/REPRODUCING/ERASING APPARATUS USING SAME

BACKGROUND OF THE INVENTION

Field of the Invention

The present invention relates to an optical head for an optical information recording and reproducing apparatus, such as an opto-magnetic disk apparatus and, more particularly, to an optical head for forming a plurality of light spots on a recording medium. The optical head of the present invention can be applied to an optical information recording/reproducing/erasing apparatus which performs recording and reproduction simultaneously or performs erasure, recording and reproduction simultaneously.

Hitherto, an optical head has been proposed which is capable of simultaneously performing erasure, recording and reproduction, or recording and reproduction, by using a plurality of light spots. One of such proposals is disclosed in, for example, U.S. Pat. No. 4,517,667.

FIG. 1 is a schematic view illustrating such a conventional optical head for generating a plurality of light beams. In FIG. 1, a monolithic semiconductor laser array 1 has a first light emitting point 2a and a second light emitting point 2b. The laser beam emitted from each of the light emitting points 2a and 2b passes through a collimator lens 3, a beam splitter 4, a quarter wavelength plate 5, and an objective lens 6, and is formed into an image on an optical disk 7 as a recording light spot 9a and a reproducing light spot 9b, respectively. The two light spots 9a and 9b are disposed on the same information track 8 on the optical 7 in such a way that the recording light spot 9a is formed before the reproducing light spot 9b. The light beams from the recording light spot 9a and the reproducing light spot 9b pass through the objective lens 6 and the quarter wavelength plate 5, reach the beam splitter 4 and are reflected by this splitter, are condensed by a condenser lens 10, and reach a sensor 11.

An example of an optical system based on what is commonly called a beam size method for detecting a defocused state on the basis of the size of a light spot formed by causing the light spots 9a and 9b to be projected on the sensor 11 is, in principle, shown in FIGS. 2(a) through 2(c). In FIGS. 2(a) through 2(c), the light beam reflected by the optical disk 7 passes through the objective lens 6 and is condensed by the condenser lens 10 on the sensor 11 positioned in front of a focal point 14 of the condenser lens 10. The sensor 11 outputs a signal indicating a defocused state. FIG. 2(b) shows a case in which the distance between the objective lens 6 and the optical disk 7 is equal to the focal length of the objective lens 6, and no defocused state occurs. The light beam condensed by the condenser lens 10 is condensed toward the focal point 14 of the condenser lens 10, and a light spot of a predetermined size is formed on the sensor 11 positioned in front of the focal point 14. FIG. 2(a) shows a case in which the distance between the objective lens 6 and the optical disk 7 is less than the focal length of the objective lens 6, and a defocused state occurs. The light beam condensed by the condenser lens 10 is condensed behind the focal point 14 of the condenser lens 10, and a light spot larger than that of FIG. 2(b) is formed on the sensor 11. FIG. 2(c) shows a case in which the distance between the objective lens 6 and the optical disk 7 is greater than the focal length of the objective lens 6, and a defocused state occurs. The light beam condensed by the condenser lens 10 is condensed in front of the focal point 14 of the condenser lens 10, and a light spot smaller than that of FIG. 2(b) is formed on the sensor 11.

Accordingly, by appropriately positioning the sensor, it is possible to simultaneously record and reproduce information while the light from the two light spots 9a and 9b is detected by the sensor 11 and the defocused state also can be corrected. (Further, any tracking deviation also can be corrected).

However, when the beam size method shown in FIGS. 2(a) through 2(c) is applied to the optical head shown in FIG. 1, which uses a plurality of light spots, the problem discussed below arises.

It is preferable that the distance between the two light spots be as small as possible because (1) the relative angle between two light beams which enter the objective lens desirably should be small in order to optimize the image forming performance of the objective lens 6, and (2) any tracking deviation of the light spot not corrected by a servo, which deviation occurs due to eccentricity of the optical disk or the like, desirably should be small when a defocus or tracking deviation is obtained from either of the two light beams and the servo is performed. On the other hand, generally speaking, since the two light spots on the sensor, as shown in FIGS. 2(a) and 2(c), are not in-focus spots, if the distance between the light spots is decreased, the two light beams on the sensor overlap each other in a portion thereof and interference occurs. When, in particular, a deviation occurs to a greater extent toward the left in FIG. 2(a) due to an adjustment error or the like, the degree of overlapping increases. On the other hand, if the distance between the focus position of the condenser lens and the sensor is decreased to decrease the spot diameter, overlapping of the light beams decreases, but the difference in the distance between the position shown in FIG. 2(b) and the position shown in FIG. 2(c) also decreases, and it becomes impossible to provide the desired defocus detection range.

SUMMARY OF THE INVENTION

The present invention solves the above-described problem of the prior art.

It is an object of the present invention to decrease the tracking deviation of a light spot which is not involved with a servo, which deviation occurs due to the eccentricity of a disk-shaped recording medium or the like, in order to sufficiently assure a desired defocus detection range, and to eliminate interference between light spots on a sensor.

To achieve the above object, according to one aspect of the present invention, there is provided an optical head for generating a plurality of light beams which detects a defocused state of a light beam. The optical head includes optical means for generating a plurality of light spots, each of which is nearly parallel, an objective lens for condensing the plurality of light beams onto an optical information recording medium in the form of a plurality of fine optical spots for performing at least one of recording/reproduction/erasure of information on or from the optical information recording medium, branching means, disposed between the optical means and the objective lens, for branching a light path of a light beam traveling toward the optical information recording medium and a light path of a light beam traveling from the optical information recording medium, a condenser lens for condensing a light beam from the optical information recording medium branched by the branching means, splitting means for splitting a light beam, branched from the optical information recording medium by the branching means and condensed by the condenser lens, into a first light beam and a second light beam, a first sensor, spaced by a predetermined distance in front of a focal point of the condenser lens, for detecting the first light beam and a second sensor, spaced by a predetermined distance behind the focal point of the condenser lens, for detecting the second light beam, wherein if the focal length of the objective lens is denoted as $f_o$, the numerical aperture of the objective lens as NA, the focal length of the condenser lens as $f_{con}$, the predetermined distance as $\Delta d$[mm], and $(f_{con}/f_o)^2 = \gamma$, the following relation is satisfied:

$$0.005\gamma \leq \Delta d \leq (0.010/NA - 0.003)\gamma.$$

According to another aspect, the present invention provides an optical head for generating a plurality of light beams, which includes optical means for generating a plurality of nearly parallel light beams, an objective lens for condensing the plurality of light beams onto an optical information recording medium in the form of a first light spot and a second light spot, which is adjacent to the first light spot, branching means, disposed between the optical means and the objective lens, for branching a light beam traveling toward the optical information recording medium and a light beam traveling from the optical information recording medium, a condenser lens for condensing a light beam branched from the optical information recording medium by the branching means, splitting means for splitting a light beam, branched from the optical information recording medium by the branching means and condensed by the condenser lens, into a first light beam and a second light beam, a first sensor, spaced by a predetermined distance in front of the focal point of the condenser lens, for detecting the first light beam and a second sensor, spaced by a predetermined distance behind the focal point of the condenser lens, for detecting the second light beam, wherein if the distance between the fine adjacent light spots formed on the optical information recording medium is $L_0$ [mm], the focal length of the objective lens is denoted as $f_o$, the numerical aperture of the objective lens as NA, the focal length of the condenser lens as $f_{con}$, the predetermined length as $\Delta d$[mm], and $(f_{con}/f_o)^2 = \gamma$, the following relation is satisfied:

$$0.005\gamma \leq \Delta d \leq L_0 \cdot \gamma/(2 \cdot NA) - 0.003\gamma.$$

In yet another aspect, the present invention provides an opto-magnetic recording/reproducing/erasing apparatus that includes a magnetic head for applying a magnetic field to an opto-magnetic recording medium and an optical head having those features discussed above in accordance with either of the first two aspects of the present invention.

According to a further aspect of the present invention, the value of $L_0$ is at most 0.02 mm.

According to still a further aspect of the present invention, the plurality of nearly parallel light beams are emitted from a light source and are formed into nearly collimated light beams by a collimator lens.

The above and further objects, aspects and novel features of the invention will more fully be appreciated from the following detailed description when read in connection with the accompanying drawings. It is to be expressly understood, however, that the drawings are for the purpose of illustration only and are not intended to limit the invention.

BRIEF DESCRIPTION OF THE DRAWINGS

FIGS. 2(a), 2(b) and 2(c) are views of a defocus detection optical system based on a beam size method;

FIG. 3(a) is a schematic view illustrating an embodiment of an opto-magnetic recording and/or reproducing apparatus of the present invention, employing an optical head, while FIGS. 3(b) and 3(c) are schematic views of sensors used in this embodiment;

Like reference numerals have been used for like or corresponding elements throughout the views.

DESCRIPTION OF THE PREFERRED EMBODIMENT

Figure 1:
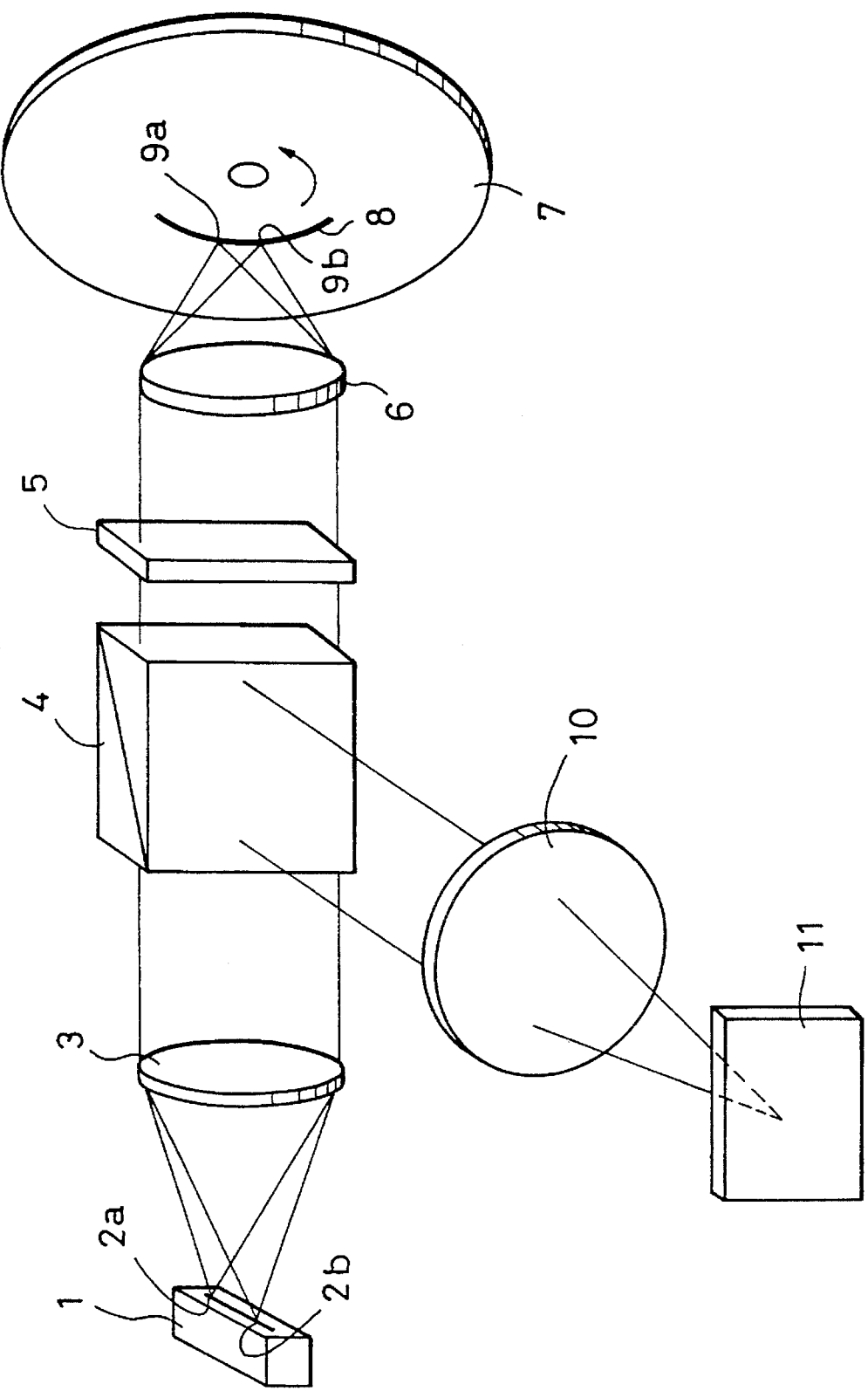
FIG. 1 is a schematic view illustrating a conventional optical head for generating a plurality of light beams.

A preferred embodiment of the present invention will be explained below with reference to the accompanying drawings.

FIG. 3(a) is a schematic view illustrating an embodiment of an opto-magnetic recording and/or reproducing apparatus in accordance with the present invention. In FIG. 3(a), a monolithic semiconductor laser array 1 has a first light emitting point 2a and a second light emitting point 2b. The laser beam emitted from each of the light emitting points 2a and 2b is formed into a collimated light beam by a collimator lens 3, passes through a beam splitter 15 with a polarized beam shaping section, is condensed by an objective lens 6, and is formed into an image on an opto-magnetic disk 7 as a recording light spot 9a and a recording and reproducing light spot 9b, respectively.

The role of each light spot will now be described. During information recording, a signal for servo (e.g., for auto-focus and auto-tracking) is reproduced from the light spot 9a, and information is recorded in cooperation with magnetic head 30, which will be described later. At the same time as the recording, the recorded information is reproduced (verification-reproduced) from the reproducing light spot 9b which is formed after the light spot 9a on the opto-magnetic disk 7 which rotates in the direction of the arrow. During normal reproduction, a signal for servo is reproduced from the recording light spot 9a, and information is reproduced from the reproducing light spot 9b. Address signals which are preformatted in the opto-magnetic disk 7 are reproduced from the recording light spot 9a when information is recorded, and reproduced from the reproducing light spot 9b during normal reproduction. Reference numeral 30 denotes a magnetic head for applying a magnetic field modulated in accordance with information to be recorded to the opto-magnetic disk 7.

The light reflected by the opto-magnetic disk 7 is condensed by the objective lens 6 again and formed into a nearly collimated light beam, reflected by the polarized beam splitter 15, the polarized plane thereof is rotated by 45° by a quarter wavelength plate 16, condensed by the condenser lens 10, reaches a beam splitter 17 where the light is divided into two beams, and the beams are formed into light spots 19a to 19d on sensors 18a and 18b, respectively.

FIGS. 3(b) and 3(c) show plan views illustrating the arrangement of the sensors 18a and 18b, respectively. The sensor 18a is formed of five sensitive areas a1 to e1; the sensitive areas a1 to d1 are for detecting the light spot 19a, and the sensitive area e1 is for detecting the light spot 19b. The sensor 18b is formed of five sensitive areas a2 to e2; the sensitive areas a2 to d2 are for detecting the light spot 19c, and the sensitive area e2 is for detecting the light spot 19d. The light spots 19a and 19c correspond to the light spot 9a on the opto-magnetic disk 7, and the light spots 19b and 19d correspond to the light spot 9b on the opto-magnetic disk 7. The sensor 18a is spaced by a predetermined distance in front of the focal point 14 of the condenser lens 10, and the sensor 18b is spaced by a predetermined distance behind the focal point 14 of the condenser lens 10.

If the outputs from each of the sensitive areas of the sensor are denoted by using the same reference numerals as those of the sensitive areas, signals are formed as described below during information recording and during normal reproduction:

During information recording
    Address signal=(a1+b1+c1+d1)+(a2+b2+c2+d2)
    Opto-magnetic information signal=e1−e2
    Defocus signal=(a1−b1−c1+d1)−(a2−b2−c2+d2) or −(b1+c1)+(b2+c2)
    Tracking deviation signal=(b1−c1)−(b2−c2)

During normal reproduction
    Address signal=e1+e2
    Opto-magnetic information signal=e1−e2
    Defocus signal=(a1−b1−c1+d1)−(a2−b2−c2+d2) or −(b1+c1)+(b2+c2)
    Tracking deviation signal=(b1−c1)−(b2−c2).

Figure 4:
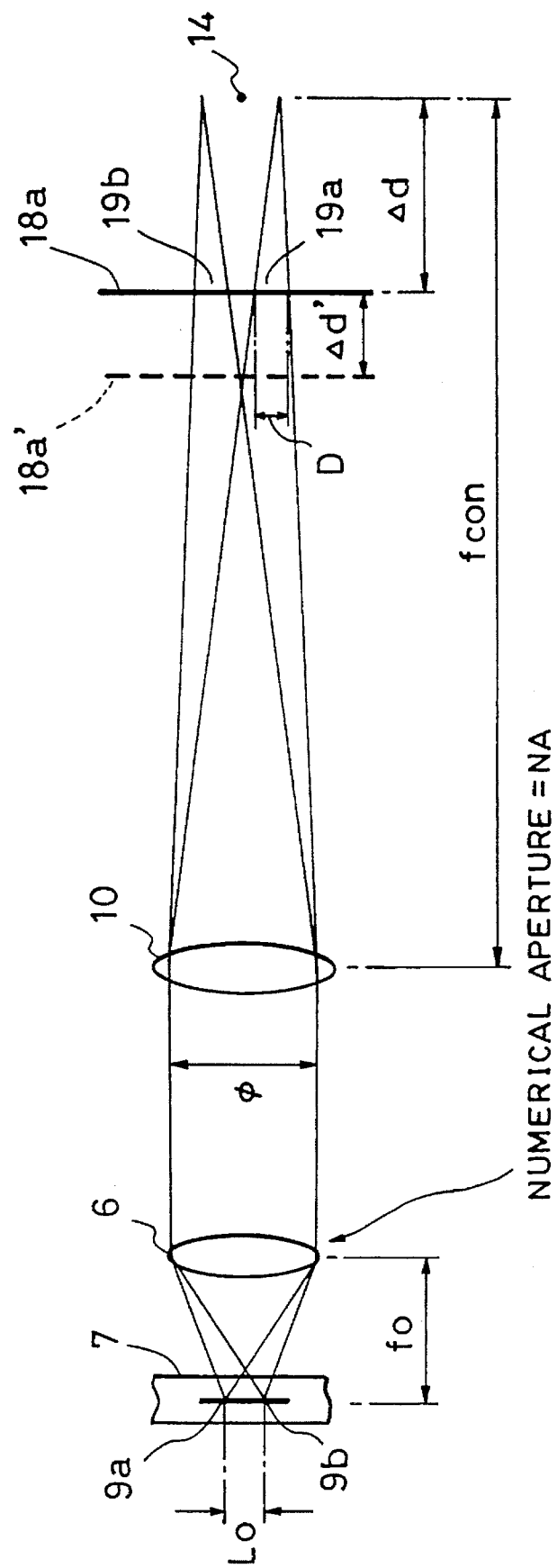
FIG. 4 is a view illustrating a defocus detection optical system of the optical head of the present invention.

FIG. 4 is a view illustrating a defocus detection optical system for use in the present invention. FIG. 4 shows an arrangement in which the light reflected by the two light spots 9a and 9b spaced by a distance $L_0$ on the opto-magnetic disk 7 passes through the objective lens 6 and the condenser lens 10 and is condensed in the form of the light spots 19a and 19b on the sensor 18a. The focal length of the objective lens 6 is $f_o$, the numerical aperture is NA, the diameter of the light beam which enters the condenser lens 10 is $\phi$, the focal length of the condenser lens 10 is $f_{con}$, and the distance between the sensor 18a and the focal point 14 of the condenser lens 10 is $\Delta d$.

If the diameter of the light spot on the sensor when the light spots 9a and 9b are focused on the opto-magnetic disk 7 is denoted as D, the following equation is satisfied:

$D=(\Delta d/f_{con})\Phi$
$\phi=NA \cdot f_o \cdot 2$
Therefore, $$D=(\Delta d/f_{con})NA \cdot f_o \cdot 2 \quad (1)$$

Also, when it is assumed that the position of the sensor deviates by $\Delta d'$ from the position of the sensor 18a in FIG. 4 toward a sensor 18a' where the light spot diameter is larger, and when the diameter of the light spot on the sensor at this time is denoted as D', and $\Delta d$ is replaced with $(\Delta d+\Delta d')$, equation (1) becomes equation (1') below:

$$D'=\{(\Delta d+\Delta d')/f_{con}\}NA \cdot f_o \cdot 2 \quad (1')$$

On the other hand, the distance between the light spots on the sensor 18a in the focused state is as described below because the lateral magnification of the optical system is $f_{con}/f_o$, and the sensor 18a deviates by the distance $\Delta d$ from the focal point 14 of the condenser lens 10:

$$L=L_0 (f_{con}-\Delta d)/f_o \quad (2)$$

Also, when it is assumed that the position of the sensor deviates by $\Delta d'$ from the position of the sensor 18a in FIG. 4 toward the sensor 18a' where the light spot diameter is large, and when the distance between the light spots on the sensor is denoted as L' when this deviation occurs and $\Delta d$ is replaced with $(\Delta d+\Delta d')$, equation (2) becomes equation (2') below:

$$L'=L_0 \{f_{con}-(\Delta d+\Delta d')\}/f_o \quad (2')$$

The following relation must be satisfied in order for the two light spots 19a and 19b not to interfere with each other on the sensor 18a:

$$D'<L' \quad (3)$$

Hence, the following relation is satisfied on the basis of equations (140), (2'), and (3):

$$(\Delta d+\Delta d')\{(f_o/f_{con})NA \cdot 2+L_0/f_o\} \leq L_0 \cdot f_{con}/f_o$$

In the above, since it can be taken that $L_0/f_o \cong 0$ (however, $L_0 \cdot f_{con}/f_o$ is not regarded as being 0), $$\Delta d \leq (f_{con}/f_o)^2 \cdot L_0/(2 \cdot NA) - \Delta d' \quad (4)$$

Defocus detection is, in principle, possible when the sensor 18a is in a range from being at the focal point position of the condenser lens 10 to the sensor position at which D'=L'. Therefore, if the detectable defocus range on one side is denoted as S, focus is achieved at a sensor position at which D'=L' in FIG. 4 when the opto-magnetic disk 7 moves gradually away from the focus position of the objective lens 6. Therefore, the following approximate equation is satisfied by using the longitudinal magnification $(f_{con}/f_o)^2$:

$$S=\Delta d (f_o/f_{con})^2/2 \quad (5)$$

Therefore, when the defocus detection range of one side $S_c$ or more is obtained, $$\Delta d \geq S_c \cdot 2 (f_{con}/f_o)^2 \quad (6)$$

The defocus detection range requires approximately 2.5 μm on one side because of the following:

[1] optical/mechanical error at the initial stage or after aging: 0.5 μm;

[2] servo tracking error due to disturbances caused by groove crossed signals of the opto-magnetic disk: 1.0 μm; and

[3] estimated amount of linearity drop in the defocus signals: 1.0 μm.

Thus, from equation (6), $$\Delta d \text{ [mm]} \geq 0.005 (f_{con}/f_o)^2 \quad (7)$$

If overlapping of the light spots can be avoided in the range of [1] and [2], the light spots do not overlap each other during the servo tracking operation. Therefore, when it is assumed that the sensor position 18a' is a position at which D'=L', that is a limit position at which the light spots do not overlap, the following relation should be satisfied on the basis of the same idea as that of equation (7), $$\Delta d' \geq 0.003 (f_{con}/f_o)^2. \quad (8)$$

Figure 5:
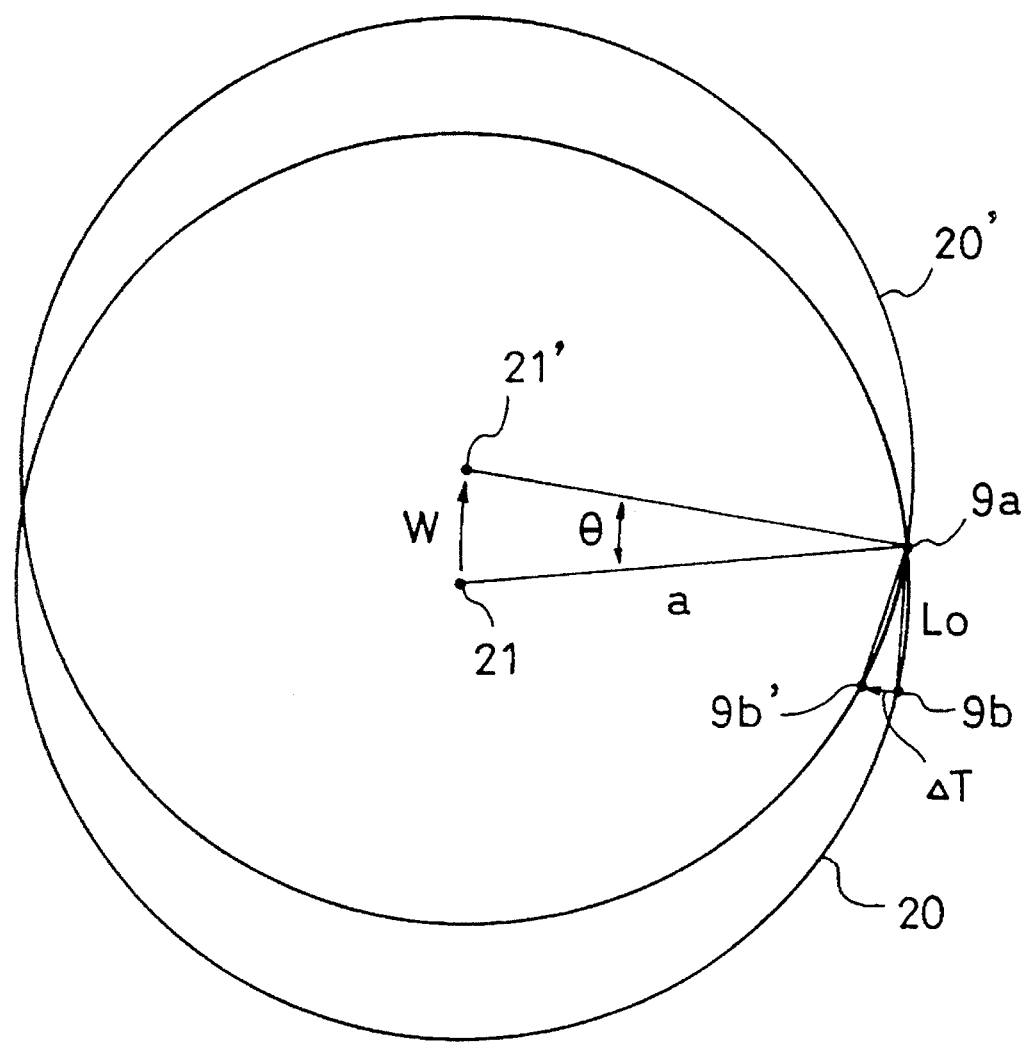
FIG. 5 is an illustration of a light spot on an opto-magnetic disk.

Next, the light spots 9a and 9b on the opto-magnetic disk 7 will be explained with reference to FIG. 5. Generally, the information tracks of the opto-magnetic disk cause an eccentricity (radial runout) of usually 50 to 100 μm as a result of the rotation of the disk. For this reason, a relative track deviation occurs between two light spots because of the following circumstances. That is, reference numeral 20 denotes an information track of a radius "a" with reference numeral 21 being the center. The two light spots 9a and 9b are spaced by a distance $L_0$ and both of them are present on the track 20. If the track 20 is decentered and rotates by an angle θ, with the light spot 9a being the center, and moves to a position shown by track 20', the center of the track moves to a position 21', and the position on the track, corresponding to the spot 9b, moves to a position shown by spot 9b'. The distance between the position of the center 21 and the position of the center 21' corresponds to an eccentricity quantity W, and the distance between the position of the spot 9b and the position of the spot 9b' is a relative track deviation quantity ΔT. Approximately, W=a·θ, ΔT=$L_0$·θ. Therefore, ΔT=$L_0$·W/a.

In the opto-magnetic disk, generally, the allowable tracking deviation is approximately 0.1 μm. Further, in the above description, it is assumed that there is no tracking deviation of the spot 9a. However, in practice, a tracking deviation occurs due to the servo tracking error and the like. Therefore, when the radius of the disk is approximately 30 mm, the relative tracking deviation ΔT should preferably be approximately 0.07 μm or less. In other words, the spot length $L_0$ is preferably about 20 μm or less. That is, $$L \text{ [mm]} \leq 0.02 \quad (9)$$

Hence, on the basis of equations (4), (8) and (9), $$\Delta d \text{ [mm]} \leq (0.010/NA - 0.003)(f_{con}/f_o)^2 \quad (10)$$

Therefore, on the basis of equations (7) and (10), $$0.005 (f_{con}/f_o)^2 \leq \Delta d \text{ [mm]} < (0.010/NA - 0.003)(f_{con}/f_o)^2 \quad (11)$$

In the above embodiment, the distance between the two light emitting points 2a and 2b of the semiconductor laser array 1 is set at 0.1 mm; the focal length $f_{co1}$ of the collimator lens 3 is set at 9.6 mm; the shaping ratio of the polarized beam splitter 15 is set at 2 (namely, the light beam width of the collimated light beam within the paper surface of FIG. 3(a) is doubled); the focal length $f_o$ of the objective lens 6 is set at 3 mm; NA is set at 0.55; and the focal length $f_{con}$ of the condenser lens 10 is set at 30 mm. Therefore, the distance $L_0$ between the light spots 9a and 9b on the opto-magnetic disk 7 becomes $L_0$=0.0156 [mm] on the basis of $L_0=\{f_o/(f_{co1}·m)\}d$. Thus, the relative tracking deviation due to the eccentricity of the disk is sufficiently suppressed.

Strictly speaking, the right side of equation (11) has a value such that $L_0$ is set at 0.02 mm. When $L_0$ is set at a certain value, it is preferable that the following relation be satisfied on the basis of equations (4) and (8):

$$0.005 (f_{con}/f_o)^2 \leq \Delta d \text{ [mm]} \leq L_0 (f_{con}/f_o)^2/(2NA) - 0.003 (f_{con}/f_o)^2 \quad (12)$$

Thus, since $\gamma=(f_{con}/f_o)^2=100$, on the basis of equation (12), $$0.5 \leq \Delta d \text{ [mm]} < 1.12.$$

In this embodiment, Δd is set at 1 mm. Thus, on the basis of equation (5), $$S \text{ [mm]}=0.005.$$

That is, the defocus detection range is twice as great as S, approximately 10 μm, and thus a sufficient detection range can be obtained.

The spot distance on the sensor in an ideal state, on the basis of equation (2), is:

$$L \text{ [mm]}=0.151.$$

The spot diameter on the sensor at this time, on the basis of equation (1), is:

$$D \text{ [mm]}=0.110.$$

The spot distance on the sensor, when an error is estimated, on the basis of equation (2), is:

$$L' \text{ [mm]}=0.149.$$

The spot diameter on the sensor at this time, on the basis of equation (1), is:

$$D' \text{ [mm]}=0.143.$$

Therefore, a gap of a minimum of approximately 0.006 mm can be assured between the two spots on the sensor, and no interference between the spots occurs.

As described above, according to the optical head for generating a plurality of light beams in accordance with the present invention, the tracking deviation of the light spot which is not involved with a servo, which deviation occurs due to eccentricity of the opto-magnetic disk or the like, is sufficiently small, the defocus detection range can be assured sufficiently, and no interference between the light spots occurs on the sensor.

Except as otherwise disclosed herein, the various components shown in outline or in block form in the drawings are individually well known and their internal construction and operation are not critical either to the making or using of this invention or to a description of the best mode of the invention.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. An optical head for generating a plurality of light beams, said optical head comprising:

optical means for generating a plurality of nearly parallel light beams;

an objective lens for condensing the plurality of light beams onto an optical information recording medium in the form of a plurality of light spots;

branching means, disposed between said optical means and said objective lens, for branching a light path of a light beam traveling toward the optical information recording medium and a light path of a light beam traveling from the optical information recording medium;

a condenser lens for condensing a light beam from the optical information recording medium branched by said branching means;

splitting means for splitting the light beam, branched from the optical information recording medium by said branching means, and condensed by said condenser lens, into a first light beam and a second light beam;

a first sensor, spaced by a predetermined distance in front of a focal point of said condenser lens for the first light beam, for detecting the first light beam; and a second sensor, spaced by a predetermined distance behind a focal point of said condenser lens for the second light beam, for detecting the second light beam, wherein if the focal length of said objective lens is denoted as $f_o$, the numerical aperture of said objective lens as NA, the focal distance of said condenser lens as $f_{con}$, the predetermined distance for at least one of the first and second sensors as $\Delta d$ (mm), and $(f_{con}/f_o)^2 = \gamma$, the following relation is satisfied:

$$0.005\gamma \leq \Delta d \leq (0.010/NA - 0.003)\gamma.$$

2. An optical head according to claim 1, wherein said first sensor and said second sensor each produce an output, which represents a defocused state.

3. An optical head according to claim 1, wherein said optical means comprises a light source for generating a plurality of light beams, and a collimator lens for converting light beams emitted from said light source into nearly collimated light beams.

4. An opto-magnetic recording/reproducing/erasing apparatus, comprising:

a magnetic head for applying a magnetic field to an opto-magnetic recording medium;

optical means for generating a plurality of nearly parallel light beams;

an objective lens for condensing the plurality of light beams onto the recording medium in the form of a plurality of light spots;

branching means, disposed between said optical means and said objective lens, for branching a light path of a light beam traveling toward the recording medium and a light path of a light beam traveling from the recording medium;

a condenser lens for condensing a light beam which branches from said opto-magnetic recording medium by said branching means;

splitting means for splitting a light beam, branched from the recording medium by said branching means and condensed by said condenser lens, into a first light beam and a second light beam;

a first sensor, spaced by a predetermined distance in front of a focal point of said condenser lens for the first light beam, for detecting the first light beam; and a second sensor, spaced by a predetermined distance behind a focal point of said condenser lens for the second light beam, for detecting the second light beam, wherein if the focal length of said objective lens is denoted as $f_o$, the numerical aperture of said objective lens as NA, the focal length of said condenser lens as $f_{con}$, the predetermined distance for at least one of the first and second sensors as $\Delta d$ (mm), and $(f_{con}/f_o)^2 = \gamma$, the following relation is satisfied:

$$0.005\gamma \leq \Delta d \leq (0.010/NA - 0.003)\gamma.$$

5. An optical head according to claim 4, wherein said first sensor and said second sensor each produce an output, which represents a defocused state.

6. An optical head according to claim 4, wherein said optical means comprises a light source for generating a plurality of light beams, and a collimator lens for converting light beams emitted from said light source into nearly collimated light beams.

7. An optical head for generating a plurality of light beams, said optical head comprising:

optical means for generating a plurality of nearly parallel light beams;

an objective lens for condensing the plurality of light beams onto an optical information recording medium in the form of a first light spot and a second light spot, which is adjacent to the first light spot;

branching means, disposed between said optical means and said objective lens, for branching a light beam traveling toward the optical information recording medium and a light beam traveling from the optical information recording medium;

a condenser lens for condensing a light beam branched from the optical information recording medium by said branching means;

splitting means for splitting a light beam, branched from the optical information recording medium by said branching means and condensed by said condenser lens, into a first light beam and a second light beam;

a first sensor, spaced by a predetermined distance in front of a focal point of said condenser lens for the first light beam, for detecting the first light beam; and a second sensor, spaced by a predetermined distance behind a focal point of the condenser lens for the second light beam, for detecting the second light beam, wherein if the focal length of said objective lens is denoted as $f_o$, the distance between the first light spot and the second light spot on the recording medium as Lo (mm), the numerical aperture of said objective lens as NA, the focal length of said condenser lens as $f_{con}$, the predetermined distance for at least one of the first and second sensors as $\Delta d$ (mm), and $(f_{con}/f_o)^2 = \gamma$, the following relation is satisfied:

$$0.005\gamma \leq \Delta d \leq L_0 \cdot \gamma/(2 \cdot NA) - 0.003\gamma.$$

8. An optical head according to claim 7, wherein said first sensor and said second sensor each produce an output, which represents a defocused state.

9. An optical head according to claim 7, wherein said optical means comprises a light source for generating a plurality of light beams, and a collimator lens for converting light beams emitted from said light source into nearly collimated light beams.

10. An optical head according to claim 7, wherein the value of $L_0$ is at most 0.02 mm.

11. An opto-magnetic recording/reproducing/erasing apparatus, comprising:

a magnetic head for applying a magnetic field to an opto-magnetic recording medium;

optical means for generating a plurality of nearly parallel light beams;

an objective lens for condensing the plurality of light beams onto the opto-magnetic recording medium in the form of a first light spot and a second light spot, which is adjacent to the first light spot;

branching means, disposed between said optical means and said objective lens, for branching a light beam traveling toward the opto-magnetic recording medium and a light beam traveling from said opto-magnetic recording medium;

a condenser lens for condensing a light beam from the opto-magnetic recording medium branched by said branching means;

splitting means for splitting a light beam, branched from the opto-magnetic recording medium by said branching means and condensed by said condenser lens, into a first light beam and a second light beam;

a first sensor, spaced by a predetermined distance in front of a focal point of said condenser lens for the first light beam, for detecting the first light beam; and a second sensor, spaced by a predetermined distance behind a focal point of said condenser lens for the second light beam, for detecting the second light beam, wherein if the focal length of said objective lens is denoted as $f_o$, the distance between the first light spot and the second light spot on the recording medium as Lo (mm), the numerical aperture of said objective lens as NA, the focal length of said condenser lens as $f_{con}$, the predetermined distance for at least one of the first and second sensors as $\Delta d$ (mm), and $(f_{con}/f_o)^2 = \gamma$, the following relation is satisfied:

$$0.005\gamma \leq \Delta d \leq L_0 \cdot \gamma/(2 \cdot NA) - 0.003\gamma.$$

12. An optical head according to claim 11, wherein said first sensor and said second sensor each produce an output, which represents a defocused state.

13. An optical head according to claim 11, wherein said optical means comprises a light source for generating a plurality of light beams, and a collimator lens for converting light beams emitted from said light source into nearly collimated light beams.

14. An optical head according to claim 11, wherein the value of $L_0$ is at most 0.02 mm.

* * * * *

UNITED STATES PATENT AND TRADEMARK OFFICE
CERTIFICATE OF CORRECTION

PATENT NO. : 5,586,097
DATED : December 17, 1996
INVENTOR(S) : Koichiro NISHIKAWA It is certified that error appears in the above-indentified patent and that said Letters Patent is hereby corrected as shown below:

ON THE COVER PAGE

Under item [57], "ABSTRACT":

Line 15, "$0.005\gamma\Delta d\pm(0.010/NA-0.003)\gamma.$" should read --$0.005\gamma\leq\Delta d\leq(0.010/NA-0.003)\gamma.$--.

IN THE DISCLOSURE

COLUMN 6:

Line 10, "$D'<L'$" should read --$D'\leq L'$--; and
Line 13, "(140 ), should read --(1'),--.

COLUMN 10:

Line 29, "Lo (mm)," should read --$L_o$ (mm),--.

COLUMN 11:

Line 15, "Lo (mm)," should read --$L_o$ (mm),--.

Signed and Sealed this

Third Day of June, 1997

*Attest:*

BRUCE LEHMAN

*Attesting Officer*  *Commissioner of Patents and Trademarks*